United States Patent [19]
Ogle
[11] 3,981,001
[45] Sept. 14, 1976

[54] MULTI-PART DISPLAY PANEL AND SYSTEM FOR OPERATING THE PANEL

[75] Inventor: James A. Ogle, Neshanic Station, N.J.
[73] Assignee: Burroughs Corporation, Detroit, Mich.

[22] Filed: Jan. 17, 1975
[21] Appl. No.: 541,735
[52] U.S. Cl. .................... 340/324 M; 315/169 TV; 340/343
[51] Int. Cl.² .................... G06F 3/14
[58] Field of Search .................... 340/324 M, 343; 315/169 TV

[56] References Cited

UNITED STATES PATENTS

| | | | |
|---|---|---|---|
| 3,683,364 | 8/1972 | Holz et al. | 340/324 M |
| 3,719,940 | 3/1973 | Lay et al. | 340/324 M |
| 3,839,714 | 10/1974 | Janning | 340/324 M |
| 3,895,371 | 7/1975 | Kaji et al. | 340/324 M |

*Primary Examiner*—Marshall M. Curtis
*Attorney, Agent, or Firm*—Robert A. Green; William B. Penn

[57] ABSTRACT

The panel driven by the circuit of the invention comprises essentially two display devices in a single gas-filled envelope. The panel comprises a left-hand portion including an array of rows and columns of scanning or priming cells and an array of rows and columns of display cells which are vertically aligned with each other, with each scanning cell communicating with a display cell. Electrode arrays are provided for operating the left-hand scanning cells and display cells in scanning fashion, column-by-column. The right-hand portion of the panel includes an identical arrangement of scanning cells, display cells, and electrode arrays therefor.

A panel of this type is particularly suitable for displaying 80 characters or so, and, in order to achieve favorable brightness in all of the cells of the panel, the two portions of the panel are operated simultaneously. The panel is operated by energizing the two sets of scanning cells sequentially, column-by-column, and, as the columns of scanning cells are energized, selected display anodes are energized by information signals to transfer glow from a scanning cell to the display cell above it.

3 Claims, 6 Drawing Figures

Fig. 2
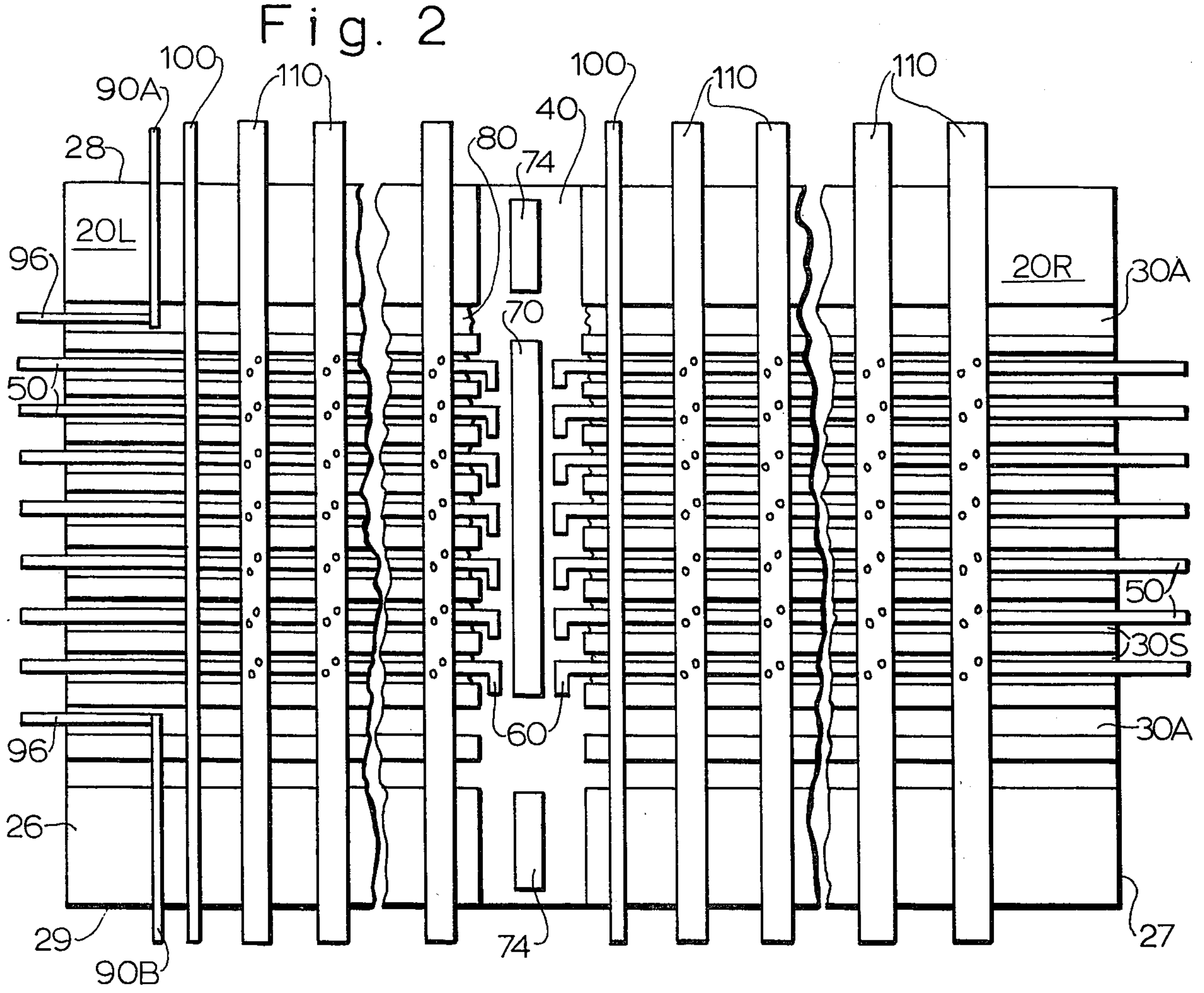
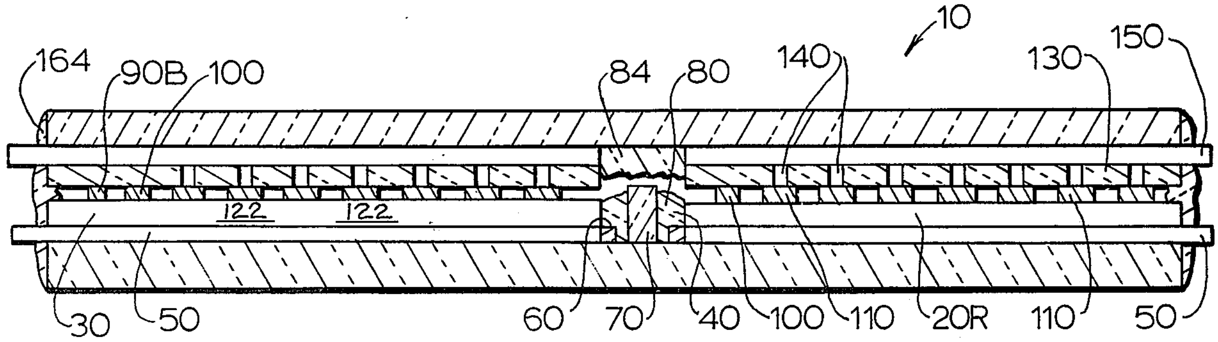
Fig. 3

MULTI-PART DISPLAY PANEL AND SYSTEM FOR OPERATING THE PANEL

BACKGROUND OF THE INVENTION

One type of display panel which is available commercially at the present time is known as a SELF-SCAN panel. The panel comprises a dot matrix which can be operated to provide a display of alphanumeric characters. Initially, these devices were provided in a size for displaying up to about 30 to 40 characters. However, there is a need for devices which can display a larger number of characters, for example, about 80 or more. The construction of such panels is difficult, but, in addition, panels of this size cannot be operated in known fashion, that is, by scanning the panel from one end to the other.

SUMMARY OF THE INVENTION

Briefly, a display panel operated according to the invention comprises two substantially identical operating portions which are combined in a single envelope and are operated to present a single message or display. In order to achieve optimum brightness of the display, the two portions of the panel are driven simultaneously.

DESCRIPTION OF THE DRAWINGS

FIG. 2 is a plan view of a portion of the panel of FIG. 1;

FIG. 3 is a sectional view of the panel of FIG. 1 assembled showing selected portions thereof;

DESCRIPTION OF THE PREFERRED EMBODIMENTS

Figure 1:
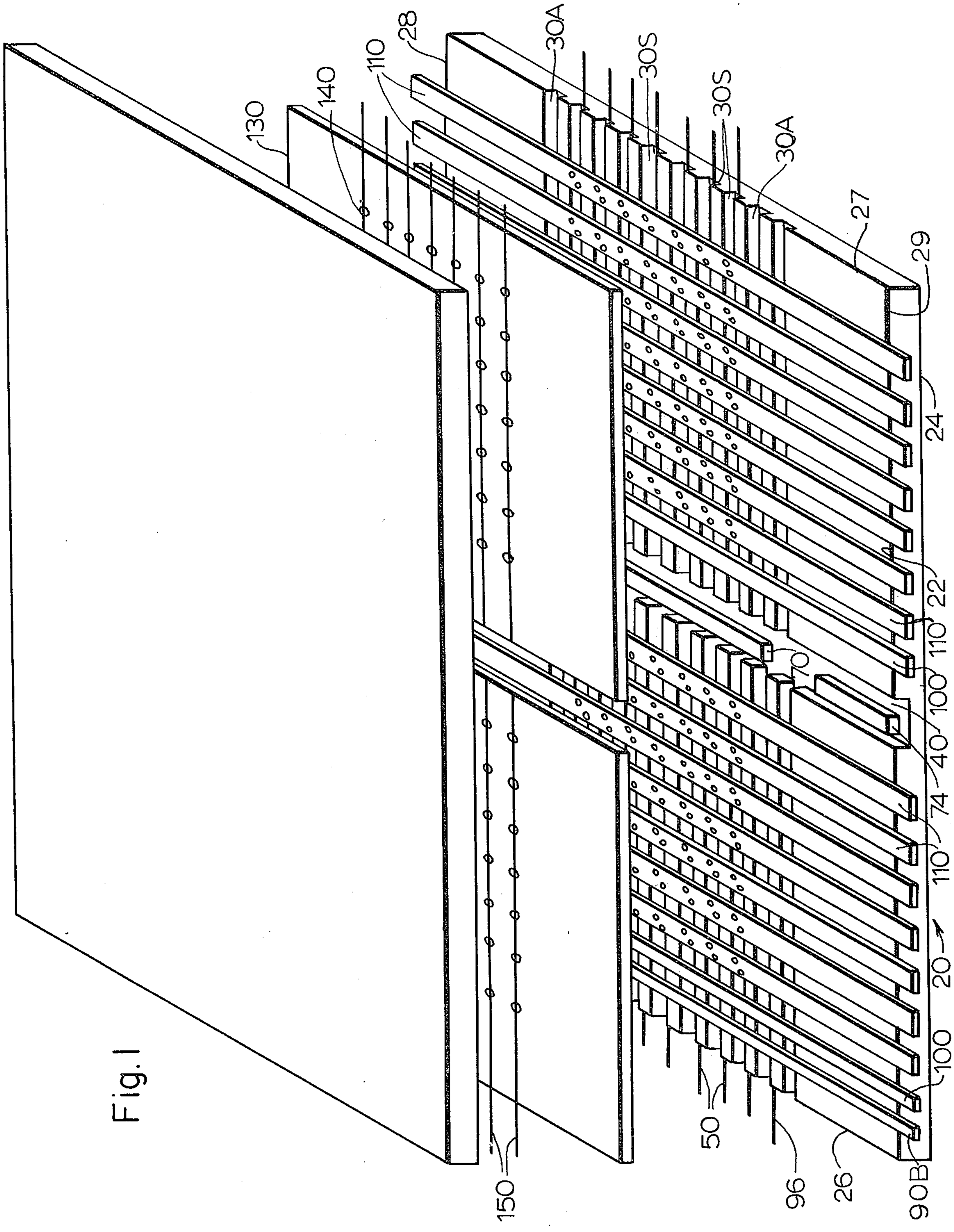
FIG. 1 is an exploded view of a display panel embodying the invention.

The panel described herein is a dot matrix display panel of the type known as a SELF-SCAN panel. These panels are made and sold by Burroughs Corporation, and they are shown and described in U.S. Pat. Nos. 3,683,222, 3,683,364, 3,766,420, and others. Reference is made to those patents for features not described in detail herein.

A display panel 10 embodying the invention includes a base plate 20 having a top surface 22, a bottom surface 24, a left edge 26, and a right edge 27, an upper edge 28, and a lower edge 29. A plurality of slots 30 are formed in the top surface of the base plate extending along its length parallel to its long axis. The slots 30 include seven slots 30S used for display purposes, and two other auxiliary slots 30A for a purpose to be described. The slots 30A are disposed, one above and one below, the array of sevel slots 30S. A transverse slot 40, oriented perpendicular to the slots 30, is provided in the top surface of the base plate at about its center, thus dividing the base plate into two identical left and right portions 20L and 20R.

A scan anode electrode 50 in the form of a metal strip is seated in the seven slots 30S of both portions of the base plate, and the inner end 60 of each of the anode strips 50 extends into the transverse slot 40 and is bent against the wall of the base plate adjacent to its slot 30. Thus, the inner ends 60 of the scan anodes do not touch each other. For purposes of this description, where convenient, the scan anodes will be referred to as left scan anodes and right scan anodes, in accordance with the portion of the base plate on which they are seated.

An insulating rod-like spacer number 70 is seated in the slot 40 between the adjacent bent ends 60 of the anode strips 50 and extending along the slots 30S. The member 70 does not extend across the slot 30A which are thus unobstructed along their lengths and communicate with each other through slot 40. Similar insulating members 74 are seated in slot 40 above and below member 70 adjacent to the upper and lower edges of the base plate 20, for a purpose to be described. The three members 70 and 74 and the ends 60 of the anode strips 50 are secured in place by means of a suitable glass frit cement 80 (FIG. 3). The left and right ends of the anode strips remote from slot 40 may also be cemented in place in their slots, if desired.

The panel 10 is provided with cathode electrodes which are also provided in two sets, a left set and a right set, except for a single set of keep-alive cathode electrodes. The keep-alive cathodes comprise two keep-alive cathode strips 90A and 90B seated on base plate 20 at the left-hand end of portion 20L and oriented transverse to the slots 30. Each keep-alive cathode 90A and 90B has its inner end overlaying one of the slots 30A in operative relation with the end of a keep-alive anode wire 96 seated therein. Each keep-alive cathode 90 and its keep-alive anode 96 form a keep-alive cell 98, the operation of which will be described below. Two cathode strips 100 operable as reset cathodes are seated, one on base plate portion 20L adjacent to the keep-alive cathodes 90 and overlaying the scan anodes with which they form a first column of reset cells 102L, and the other seated on base plate portion 20R at the left hand end thereof adjacent to slot 40 and overlaying the scan anodes in the slots therein with which they form a second column of reset cells 102R. The reset cathodes 100 may include tabs (not shown) which extend downwardly in slots 30S toward the scan anodes as shown in U.S. Pat. No. 3,767,968.

The panel 10 also includes a plurality of parallel scan-display cathodes 110 seated on the base plate 20 and extending along the entire length thereof. Each cathode 110 is provided with at least two small apertures 120, with each such pair of apertures overlaying one of the slots 30S. The lower surface of each cathode 110 and the portion of the scan anode 50 beneath it form a scanning or priming cell 122. Thus, each pair of cathode holes is aligned with a scanning cell. The holes 120 provide gas communication between the scanning or priming cells 122 and display cells (to be described) above them, and the use of two holes (or more) above each scanning cell renders alignment therewith less critical than if one hole were used as in prior art panels. The vertical cathodes 110 and horizontal anodes 50 thus form an array of rows and columns of scanning cells.

As shown in FIG. 3, spacer member 70 is of such a height that it extends vertically to about the level of the cathodes so that the left-hand cathodes do not see the right-hand cathodes.

Panel 10 also includes two apertured cell sheets 130L and 130R of insulating material seated on the base plate spaced from each other, with the cathodes disposed between the cell sheets and base plate 20. The cell sheets include a matrix of apertures or display cells 140 arrayed in rows and columns, with each column of such cells aligned with a cathode electrode and the aperture pairs therein, and each row of cells being aligned with a slot 30S and a row of scanning cells 122. Thus, there are two sets of display cells for the two sets of scanning cells, and each display cell 140 is aligned with a scanning or priming cell 122.

The top surface of each cell sheet is provided with a plurality of parallel slots 144, and a display anode wire 150 is seated in each slot, thus providing left and right sets of display anodes which are insulated from each other at the inner adjacent ends of the cell sheets. One or both ends of the display anode wires 150 are secured in place in any suitable fashion. Each display anode wire overlays and is aligned with a row of display cells 140. The portion of the top surface of each cathode 110 and the portion of each display anode 150 located at a cell 130 comprise the electrodes for the display cell.

A glass face plate 160 is seated on the display anodes 150, and the entire assembly is hermetically sealed by means of a glass frit 164 or the like disposed about the adjacent perimeters of the base plate, center sheet, and face plate. The various electrodes pass through and are secured in place by the seal.

The presence of the insulating rods 74 in the upper and lower portions of the transverse slot 40 insures the formation of a good seal in this area by holding the frit seal material in place during the sealing process.

The panel is filled with the desired ionizable gas and mercury vapor through a tubulation secured to the base plate, and it is processed in any suitable manner well known to those skilled in the art.

In the manufacture of panel 10, the panel can be made generally in sub-assemblies, with one assembly comprising the scan anodes 50, keep-alive electrodes and cathodes 100 and 110 being secured to the base plate along with the spacer members 70 and 74, and with the second assembly comprising the face plate 160, the display anodes 150 and the cell sheets 120. The parts of the subassemblies are secured together by a glass frit seal of Pyroceram or the like disposed about adjacent perimeters of all of the parts and in slots 30 and 40 and elsewhere as required. Seal material 80 shown in FIG. 3 holds the members 70 and 74 and anodes 50 in place; seal material 84 between the cell sheets at the center of the panel holds the inner ends of the cell sheets and the ends of the anodes 150 in place. Those skilled in the art can readily determine what parts need be secured in place in this way.

Figure 4:
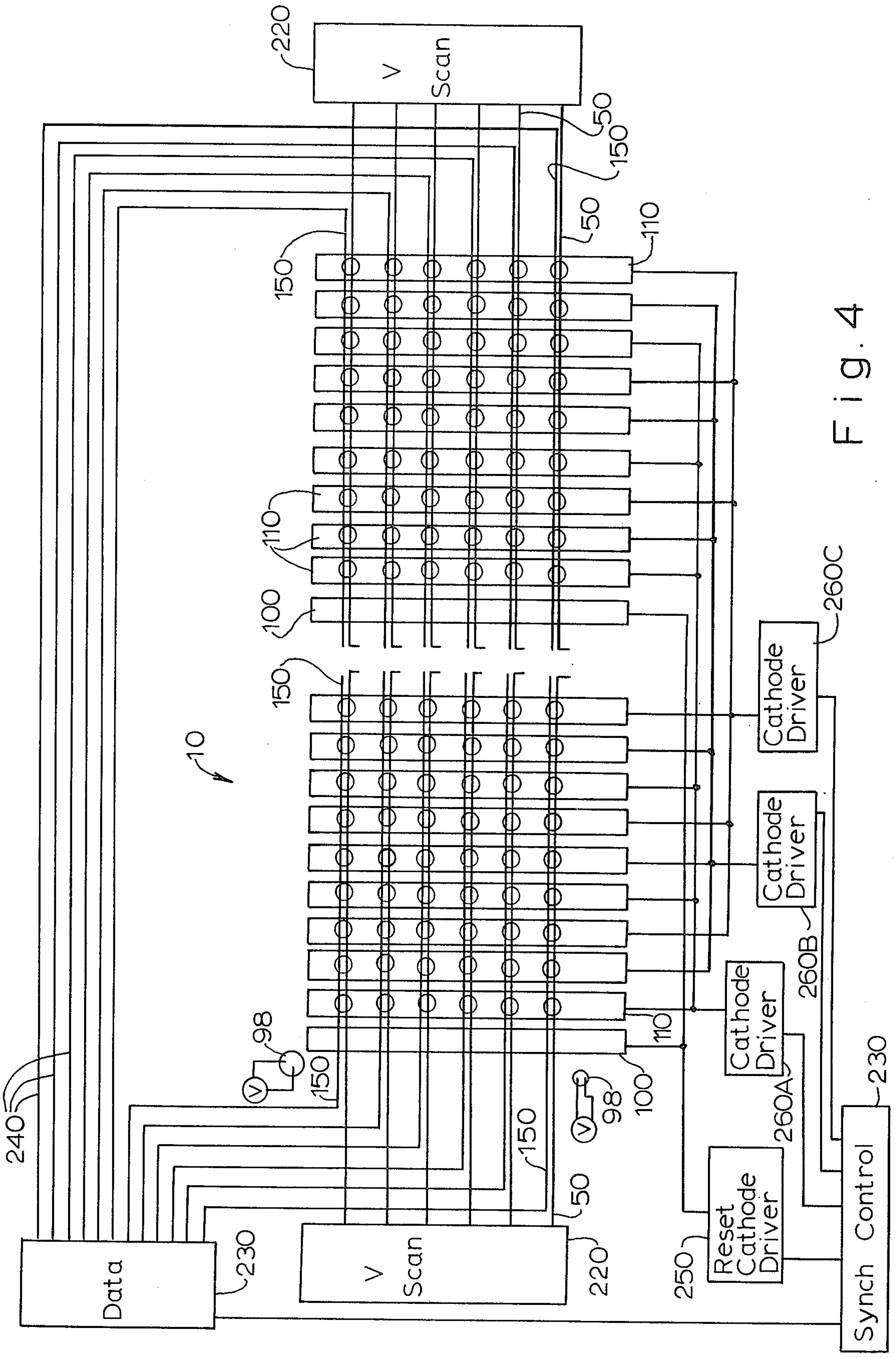
FIG. 4 is a schematic representation of the display panel of FIG. 1 and a circuit in which it may be operated.

In operation of the panel 10 referring to FIG. 4, the scan cathodes 50 are connected to a suitable, generally positive D.C. power source 220, and the display anodes 150 are coupled to the output of a data source 230. The data source 230 is considered to include, for example, a computer, suitable memories, encoders, decoders, and the like, the output of which is data signals which are coupled by way of leads 240 to each of the display anodes. The keep-alive cells are connected to a power source such that the cells are ionized continually at a relatively low level at which they generate excited particles. The reset cathodes 100 are connected to a reset cathode driver 250 for applying operating potential thereto. As described in the above-identified application, the scan-display cathodes 110 are connected in groups, with, for example, every third cathode being connected in the same group, and each group is connected to a cathode driver 260. The corresponding groups of cathodes in the two portions of the panel are connected to the same driver, as shown. A synchronizing control circuit 270 is provided to synchronize the operation of the various circuit elements, as described below.

In operation, with the keep-alive cells energized and generating excited particles, operating potential is applied to the reset cathodes 100 and to all of the scan anodes 50, and both columns of reset cells are energized with the assistance of particles from the keep-alive cells and generate excited particles which are available to the adjacent first scan-display cathode 110 adjacent thereto. As each of the cathode drivers 260 is energized in turn, the columns of priming or scanning cells associated therewith in the two halves of the panel are energized and turn on. Thus, first, the columns of scanning cells adjacent to the two columns of reset cells are turned on, then the next two adjacent columns of scanning cells are turned on, and this operation is continued until the last cathode in each section of the panel is turned on, whereupon the reset driver is again operated to fire the two columns of reset cells and to initiate another scanning cycle. It is noted that the scanning operation is facilitated by the diffusion of excited particles through the slots 30 from a fired column of cells to the next adjacent column which is to be fired. It is also to be noted that excited particles from the last column of scanning cells in the left-hand section of the panel diffuses through the upper and lower slots 30A to act as a keep-alive cell and provide excited particles for the adjacent reset cathode 100 of the second section of the panel.

Simultaneously with the firing of the columns of scanning cells, information signals are applied from the data source 230 to the display cathodes 110, and, where dictated by these signals, glow is transferred from selected scanning cells in each column to the associated display cells in each column. This scanning and display operation is carried out sequentially throughout the two portions of the panel simultaneously at such a rate that a changeable but apparently stationary message is displayed in the panel as a whole. Reference is again made to the above-identified application for a more detailed description of the operation of a SELF-SCAN panel.

What is claimed is:

1. A system for operating a display panel wherein the display panel comprises, in a single gas-filled envelope, a first portion and a second portion, each said portion including an array of scanning cells disposed in rows and columns and an array of display cells disposed in rows and columns, each scanning cell communicating with a display cell, there being a first column of scanning cells and display cells, a last column of scanning cells and display cells, and intermediate columns of scanning cells and display cells in said first and second portions, a column of reset cells adjacent to the first column of scanning cells in each said array, an array of scanning anodes and scanning cathodes associated with each set of scanning cells, and an array of display anodes and display cathodes associated with each set of display cells, and anode and cathode electrodes associated with each column of reset cells, said system comprising first circuit means coupled to the scanning anodes and scanning cathodes of said array of scanning cells of said first portion of said panel, said first circuit means also being coupled to the scanning anodes and scanning cathodes of said array of scanning cells of said second portion of said panel, said first circuit means scanning said columns of scanning cells of said first and second portions of said panel sequentially and simultaneously beginning with the first and ending with the last, and second circuit means coupled to said display anodes of both portions of said panel for causing selected display cells to glow as said columns of scanning cells are energized.

2. A system for operating a display panel wherein the display panel comprises, in a single gas-filled envelope, a first portion and a second portion, each said portion including an array of scanning cells disposed in rows and columns and an array of display cells disposed in rows and columns, each scanning cell communicating with a display cell, there being a first column of scanning cells and display cells, a last column of scanning cells and display cells, and intermediate columns of scanning cells and display cells in said first and second portions, a column of reset cells adjacent to the first column of scanning cells in each said array, an array of scanning anodes and scanning cathodes associated with each set of scanning cells, and an array of display anodes and display cathodes associated with each set of display cells, and anode and cathode electrodes associated with each column of reset cells, said system comprising first circuit means coupled to said scanning anodes and scanning cathodes of each said portion of said panel for firing said scanning cells column by column sequentially with corresponding columns of both portions fired at the same time, and second circuit means for simultaneously applying information signals to the display anodes of both said portions for energizing selected display cells of both portions in accordance with said input information.

3. A system for operating a display panel wherein the display panel comprises, in a single gas-filled envelope, a first portion and a second portion, each said portion including an array of scanning cells disposed in rows and columns and an array of display cells disposed in rows and columns, each scanning cell communicating with a display cell, there being a first column of scanning cells and display cells, a last column of scanning cells and display cells and intermediate columns of scanning cells and display cells in said first and second portions, a column of reset cells adjacent to the first column of scanning cells in each said array, an array of scanning anodes and scanning cathodes associated with each set of scanning cells, and an array of display anodes and display cathodes associated with each set of display cells, and anode and cathode electrodes associated with each column of reset cells, said system comprising first circuit means coupled to all of said scanning anodes for applying power thereto, drive circuits connected to said scanning cathodes to drive said scanning cathodes sequentially, with the same corresponding cathodes in both portions of said panel being driven thereby at the same time, and second circuit means for simultaneously applying information signals to the display anodes of both portions of said panel for energizing selected display cells of both sets in accordance with said input information.

* * * * *